(12) United States Patent
Choi et al.

(10) Patent No.: US 11,390,816 B2
(45) Date of Patent: Jul. 19, 2022

(54) PROCESS TO IMPROVE THE STABILITY OF THERMALLY CRACKED PETROLEUM PRODUCTS

(71) Applicant: Saudi Arabian Oil Company, Dhahran (SA)

(72) Inventors: Ki-Hyouk Choi, Dhahran (SA); Mazin M. Fathi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/902,847

(22) Filed: Jun. 16, 2020

(65) Prior Publication Data

US 2021/0388274 A1 Dec. 16, 2021

(51) Int. Cl.
*C10G 69/08* (2006.01)
*C10G 57/00* (2006.01)
*C10G 9/36* (2006.01)
*C10G 35/09* (2006.01)

(52) U.S. Cl.
CPC .............. *C10G 57/00* (2013.01); *C10G 9/36* (2013.01); *C10G 35/09* (2013.01); *C10G 2300/1074* (2013.01); *C10G 2300/202* (2013.01); *C10G 2300/301* (2013.01); *C10G 2300/308* (2013.01); *C10G 2300/4006* (2013.01); *C10G 2300/4012* (2013.01)

(58) Field of Classification Search
CPC .......... C10G 57/00; C10G 9/36; C10G 35/09; C10G 2300/4012; C10G 2300/301; C10G 2300/4006; C10G 2300/202; C10G 2300/1074; C10G 63/02; C10G 63/04; C10G 69/08
See application file for complete search history.

(56) References Cited

U.S. PATENT DOCUMENTS

| 4,014,780 A | 3/1977 | Mccoy |
| 4,428,824 A | 1/1984 | Choi et al. |
| 4,846,958 A | 7/1989 | Feldman et al. |
| 2009/0159498 A1 | 6/2009 | Chinn et al. |

(Continued)

FOREIGN PATENT DOCUMENTS

| GB | 2393320 A | 3/2004 |
| WO | 2010051441 A1 | 5/2010 |

OTHER PUBLICATIONS

International Search Report and Written Opinin dated Jul. 30, 2021 pertaining to International application No. PCT/US2021/027720 filed Apr. 16, 2021, 13 pages.

(Continued)

*Primary Examiner* — Michelle Stein
(74) *Attorney, Agent, or Firm* — Dinsmore & Shohl LLP

(57) ABSTRACT

A process for forming a petroleum product includes introducing a feed stream of a petroleum feedstock to a supercritical water reactor. The feed stream is reacted with supercritical water in the supercritical water reactor, thereby forming a supercritical water reactor effluent. The supercritical water reactor effluent is introduced to a separator to separate the supercritical water reactor effluent into a light stream and a heavy stream. At least a portion of the light stream is introduced to a reformer to concentrate aromatics in the at least a portion of the light stream, thereby forming a reformer effluent. The reformer effluent is mixed with the heavy stream.

20 Claims, 2 Drawing Sheets

(56) References Cited

U.S. PATENT DOCUMENTS

| | | |
|---|---|---|
| 2009/0286125 A1 | 11/2009 | Setlock et al. |
| 2014/0109465 A1 | 4/2014 | Coppola et al. |
| 2015/0275102 A1* | 10/2015 | Yanagawa .............. B01J 19/245 585/251 |
| 2015/0321975 A1* | 11/2015 | Choi ........................ C10G 9/00 585/400 |
| 2018/0066197 A1* | 3/2018 | Koseoglu ................ C10G 69/00 |
| 2018/0187096 A1 | 7/2018 | Choi et al. |
| 2018/0187097 A1 | 7/2018 | Choi et al. |
| 2018/0258353 A1 | 9/2018 | Choi et al. |
| 2021/0122985 A1 | 4/2021 | Choi et al. |

OTHER PUBLICATIONS

U.S. Office Action dated Sep. 16, 2021 pertaining to U.S. Appl. No. 17/142,746, filed Jan. 6, 2021, 12 pages.

International Search Report and Written Opinion dated Oct. 14, 2021 pertaining to International application No. PCT/US2021/040481 filed Jul. 6, 2021, 13 pages.

* cited by examiner

PROCESS TO IMPROVE THE STABILITY OF THERMALLY CRACKED PETROLEUM PRODUCTS

TECHNICAL FIELD

Embodiments of the present disclosure generally relate to processes of forming thermally cracked petroleum products with improved stability.

BACKGROUND

Thermal cracking is one of the most adopted processes to upgrade heavy oil. Because the performance of thermal cracking does not strongly depend on the properties of the feed stream, thermal cracking has been regarded as final step used to obtain valuable distillates from heavy portions of the streams.

SUMMARY

Even though thermally cracking is not strongly dependent on the properties of the feed stream, to produce high-end coke, such as anode grade coke, sophisticated selection of the feed stream components and thermal cracking operating conditions must be selected. These feed streams and operating conditions can lead to problems with stability of the resulting products.

The stability of thermally cracked products is deteriorated by the presence of olefins and diolefins in the product stream. These olefins and diolefins are prone to oxidation by air to form various gums. Also, asphaltene precipitation in the thermally cracked product is frequently present. Asphaltene precipitation is caused by excess amount of paraffins as well as a decrease in the asphaltene solvating power of the oil. Accordingly, the presence of olefins, diolefins, and paraffins in the thermally cracked product can result in deteriorated stability of the thermally cracked product.

Accordingly, a need exists for processes for thermally cracking a hydrocarbon feed stock, such as heavy oil, to produce thermally cracked products with improved stability. According to embodiments disclosed and described herein, this and other needs are addressed by using a supercritical water process in conjunction with reformation. Without being bound by any particular theory, it is believed that the processes disclosed and described herein improve the stability of the product stream by reducing the content of olefins, diolefins, and paraffins in the thermally cracked product.

According to a first aspect a process for forming a petroleum product comprises: introducing a feed stream comprising a petroleum feedstock to a supercritical water reactor; reacting the feed stream and supercritical water in the supercritical water reactor, thereby forming a supercritical water reactor effluent; introducing the supercritical water reactor effluent to a separator to separate the supercritical water reactor effluent into a light stream and a heavy stream; introducing at least a portion of the light stream to a reformer to concentrate aromatics in the at least a portion of the light stream, thereby forming a reformer effluent; and mixing the reformer effluent and the heavy stream.

A second aspect includes the process according to the first aspect, wherein the light stream comprises water and a petroleum phase; the process further comprises separating the water and the petroleum phase in the light stream; and introducing at least a portion of the light stream to the reformer comprises introducing the petroleum phase to the reformer.

A third aspect includes the process according to the first or second aspects, wherein the process further comprises introducing the light stream to a desulfurization unit to reduce a concentration of sulfur in the light stream before introducing the at least a portion of the light stream to the reformer.

A fourth aspect includes the process according to any one of the first to third aspects, wherein the feed stream is pressurized before it is introduced to the supercritical water reactor.

A fifth aspect includes the process according to any one of the first to fourth aspects, wherein the feed stream is pre-heated before it is introduced to the supercritical water reactor.

A sixth aspect includes the process according to any one of the first to fifth aspects, wherein the feed stream comprises a petroleum feedstock stream and a water stream.

A seventh aspect includes the process according to the sixth aspect, wherein the process further comprises mixing the petroleum feed stock stream and the water stream in a mixer to form the feed stream before the feed stream is introduced into the supercritical water reactor.

An eighth aspect includes the process according to any one of the first to seventh aspects, wherein the process further comprises introducing the supercritical water reactor effluent into a cooler to reduce the temperature of the supercritical water reactor effluent before the supercritical water reactor effluent is introduced to the separator.

A ninth aspect includes the process according to any one of the first to eighth aspects, wherein the process further comprises introducing the supercritical water reactor effluent into a depressurization unit to reduce the pressure of the supercritical water reactor effluent before the supercritical water reactor effluent is introduced to the separator.

A tenth aspect includes the process according to any one of the first to ninth aspects, wherein the at least a portion of the light stream introduced to the reformer has a water content that is less than 10 wt. % ppm.

An eleventh aspect includes the process according to any one of the first to tenth aspects, wherein the at least a portion of the light stream introduced to the reformer has a sulfur concentration that is less than 0.7 wt. % ppm.

A twelfth aspect includes the process according to any one of the first to eleventh aspects, wherein a temperature in the reformer is greater than 450° C. and less than 550° C.

A thirteenth aspect includes the process according to any one of the first to twelfth aspects, wherein a pressure in the reformer is greater than 0.3 MPa and less than 4.0 MPa.

A fourteenth aspect includes the process according to any one of the first to thirteenth aspects, wherein the feed stream has an atmospheric residue T5% greater than 330° C.

A fifteenth aspect includes the process according to any one of the first to fourteenth aspects, wherein the feed stream has a vacuum residue with a T5% greater than 550° C.

A sixteenth aspect includes the process according to any one of the first to fifteenth aspects, wherein the feed stream has a vacuum gas oil (VGO) having a T5% that is greater than 330° C.

A seventeenth aspect includes the process according to any one of the first to sixteenth aspects, wherein the feed stream has a VGO having a T95% that is less than 595° C.

An eighteenth aspect includes the process according to any one of the first to seventeenth aspects, wherein the feed stream has an asphaltene content of greater than 2 wt. %.

A nineteenth aspect includes the process according to any one of the first to eighteenth aspects, wherein a pressure of the feed stream that is introduced to the supercritical water reactor is greater than 20 MPa.

A twentieth aspect includes the process according to the nineteenth aspect, wherein a temperature within the supercritical water reactor is greater than 350° C. and less than 600° C.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
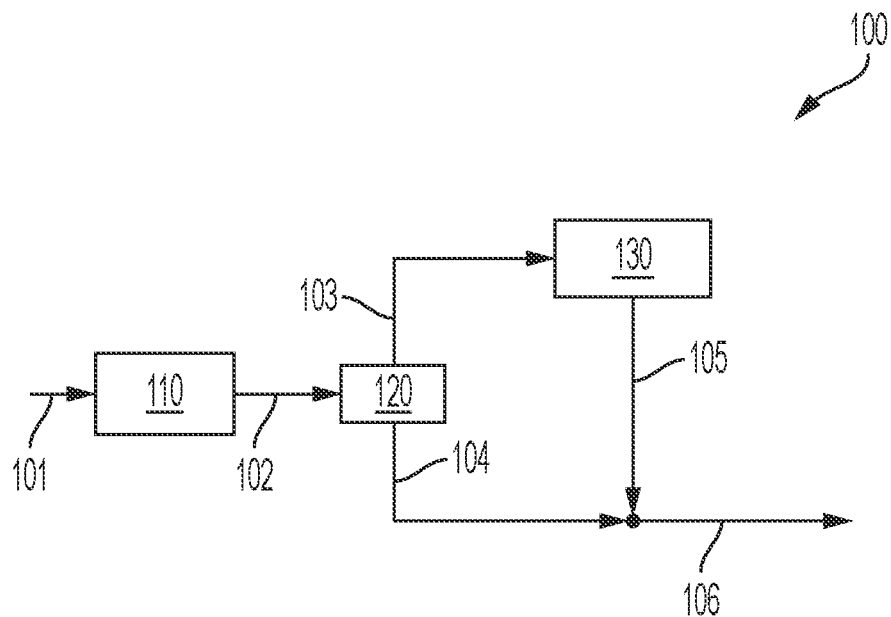
FIG. 1 is a process flow chart of processes according to one or more embodiments described in this disclosure.

As used throughout this disclosure, the term "olefin" refers to a compound made up of hydrogen and carbon that contains a pair or more of carbon atoms linked by a double bond. Olefins as used herein include cyclic and aliphatic olefins.

As used throughout this disclosure, the term "diolefin" refers to a compound made up of hydrogen and carbon that contains two pairs of carbon atoms linked by a double bond.

As used throughout this disclosure, the term "aromatic" refers to a compound containing a cyclic planar unsaturated ring of atoms that is stabilized by resonance bonds. Such compounds include, but are not limited to, benzene.

As used throughout this disclosure, the term "supercritical water" refers to water at a temperature and pressure above its critical point, where distinct liquid and gas phases do not exist. Supercritical water can diffuse through liquid and gas like steam, and dissolve materials like liquid solvent.

The present disclosure is directed to processes for forming thermally cracked products with improved stability using a supercritical water reactor in conjunction with reformation. In embodiments, and with reference to FIG. 1, processes according to embodiments disclosed or described herein processes streams through a supercritical water reactor 110. The supercritical water reactor 110 is fluidly connected to a separator 120. The supercritical water reactor 110 is positioned upstream from the separator 120 and, thus, the separator 120 is positioned downstream from the supercritical water reactor 110. The separator 120 is also fluidly connected to a reformer 130. The separator 120 is positioned upstream of the reformer 130 and, thus, the reformer 130 is positioned downstream of the separator 120. As used herein, "fluidly connected" means that fluid, such as a gas or a liquid, is capable of flowing from one component (e.g., the supercritical water reactor 110, the separator 120, or the reformer 130) to which the component is fluidly connected. The term "fluidly connected" as used herein does not require a direct connection between two components, and intermediate components may be present. For instance, and with reference to FIG. 1, a pump (not shown) may be positioned between the supercritical water reactor 110 and the separator 120 and the supercritical water reactor 110 is still fluidly connected to the separator 120. It should also be understood that fluids being transferred between components may contain solid particulates. Each of these components will be described in more detail below.

According to embodiments, and again with reference to FIG. 1, a feed stream 101 is introduced into the supercritical water reactor 110, where the feed stream 101 reacts with the supercritical water in the supercritical water reactor 110. The reaction product of the supercritical water in the supercritical water reactor 110 and the feed stream 101 exits the supercritical water reactor 110 as supercritical water reactor effluent 102, and the supercritical water effluent 102 is introduced into separator 120. At the separator 120, the supercritical water effluent 102 is separated into a light (e.g., vapor) stream 103 and a heavy (e.g., liquid) stream 104. Olefins and paraffins, which deteriorate the stability of the product, are contained in the light stream 103. A petroleum phase in the light stream 103 is separated from water and then the petroleum phase is transferred to the reformer 130 to concentrate the aromatics. In embodiments, a water-oil separator may be used to separate the petroleum phase in the light stream 103 and the water in the light stream 103. Any suitable, known water-oil separator can be used. In embodiments, such as the embodiments depicted in FIG. 1, the water-oil oil separator is internal to the separator 120. However, in other embodiments, the water-oil separator is external (not shown in FIG. 1) to the separator 120. The aromatic concentrated stream exits the reformer 130 as reformer effluent 105. The reformer effluent 105 is then combined with the heavy stream 104 to form stable product stream 106. Although not depicted in FIG. 1, the reformer effluent 105 may be divided into different streams. One of the streams may be mixed with the heavy stream 104, and the other stream may be blended with gasoline or used as feedstock for in an aromatic benzene, toluene, and xylene (BTX) extraction process.

Figure 2:
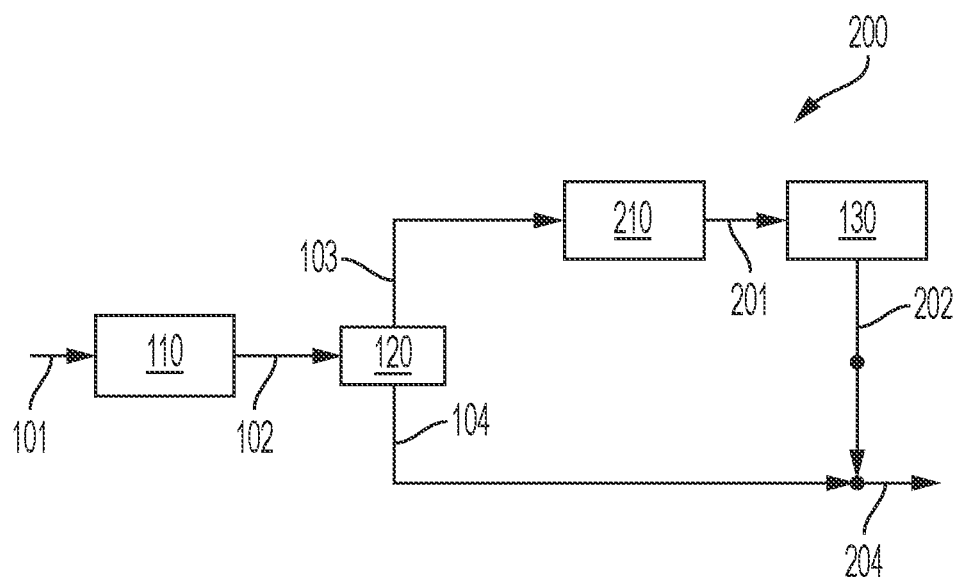
FIG. 2 is a process flow chart of processes according to one or more embodiments described in this disclosure.

In one or more embodiments, and with reference to FIG. 2, the process may include a desulfurization unit 210. Processes according to embodiments disclosed or described herein processes streams through a supercritical water reactor 110. The supercritical water reactor 110 is fluidly connected to a separator 120. The supercritical water reactor 110 is positioned upstream from the separator 120 and, thus, the separator 120 is positioned downstream from the supercritical water reactor 110. The separator 120 is also fluidly connected to a desulfurization unit 210. The separator 120 is positioned upstream from the desulfurization unit 210 and, thus, the desulfurization unit 210 is positioned downstream from the separator 120. The desulfurization unit 210 unit is also fluidly connected to a reformer 130. The desulfurization unit 210 is positioned upstream of the reformer 130 and, thus, the reformer 130 is positioned downstream of the desulfurization unit 210.

According to embodiments, and again with reference to FIG. 2, a feed stream 101 is introduced into the supercritical water reactor 110, where the feed stream 101 reacts with the supercritical water in the supercritical water reactor 110. The reaction product of the supercritical water in the supercritical water reactor 110 and the feed stream 101 exits the supercritical water reactor 110 as supercritical water reactor effluent 102, and the supercritical water effluent 102 is introduced into separator 120. At the separator 120, the supercritical water effluent 102 is separated into a light (e.g., vapor) stream 103 and a heavy (e.g., liquid) stream 104. Olefins and paraffins, which deteriorate the stability of the product, are contained in the light stream 103. A petroleum phase in the light stream 103 is separated from water. In embodiments, a water-oil separator may be used to separate the petroleum phase in the light stream 103 and the water in the light stream 103. Any suitable, known water-oil separator can be used. In embodiments, such as the embodiments depicted in FIG. 2, the water-oil oil separator is internal to the separator 120. However, in other embodiments, the water-oil separator is external (not shown in FIG. 2) to the separator 120. However, the petroleum phase separated from water in the light stream 103 may contain relatively high concentrations of sulfur that can poison the reformation catalyst. In such a case, after exiting the separator 120, the petroleum phase is introduced into a desulfurization unit 210 where sulfur is removed from the petroleum phase. A desulfurized stream 201 exits the desulfurization unit 210 and is introduced into the reformer 130 to concentrate the aromatics in the desulfurized stream 201. The aromatic concentrated steam exits the reformer 130 as reformer effluent 105. The reformer effluent 105 is then combined with the heavy stream 104 to form stable product stream 204. Although not depicted in FIG. 2, the reformer effluent 105 may be divided into different streams. One of the streams may be mixed with the heavy stream 104, and the other stream may be blended with gasoline or used as feedstock for in an aromatic benzene, toluene, and xylene (BTX) extraction process.

As shown in the embodiments depicted by FIG. 1 and FIG. 2, the supercritical water reactor effluent 102 is separated into a light stream 103 and a heavy stream 104. At least a portion of the light stream is then subjected to reformation, such as catalytic reformation, in reformer 130 before being mixed back into the heavy stream 104. By separating the supercritical water reactor effluent 102, distillation unit is not required for processing the lighter fraction of the supercritical water reactor effluent 102. Moreover, by processing the at least a portion, such as a petroleum phase, of the light stream 103 in the reformer 130, a separate stabilizer is not needed for a stable product.

According to one or more embodiments, various streams may be treated, such as, for example, to modify one or more of temperature and pressure prior to entering one of the components (e.g., the supercritical water reactor 110, separator 120, reformer 130, and desulfurization unit 210) of the process. Embodiments disclosing such treatments will now be described with reference to FIG. 3. Processes according to embodiments depicted in FIG. 3 send streams through pumps 310a and 310b. The pumps 310a and 310b are fluidly connected to pre-heaters 320a and 320b, respectively. The pumps 310a and 310b are positioned upstream from pre-heaters 320a and 320b and, thus, pre-heaters 320a and 320b are downstream from pumps 310a and 310b. The pumps 320a and 320b are fluidly connected to mixer 330, where the effluent from pre-heaters 320a and 320b are combined. The pre-heaters 320a and 320b are positioned upstream from the mixer 330 and, thus, the mixer 330 is positioned downstream from pre-heaters 320a and 320b. In one or more embodiments, one or both of pre-heater 320a and pre-heater 320b may be a heat exchanger that transfers heat from another stream to one or both of the petroleum feedstock stream 101a and the water stream 101b, respectively. The mixer 330 is fluidly connected to the supercritical water reactor 110. The mixer 330 is positioned upstream from the supercritical water reactor 110 and, thus, the supercritical water reactor 110 is positioned downstream from the mixer 330. The supercritical water reactor 110 is fluidly connected to a cooler 340. The supercritical water reactor 110 is positioned upstream from the cooler 340 and, thus, the cooler 340 is positioned downstream from the supercritical water reactor 110. The cooler 340 is fluidly connected to a depressurizer 350. The cooler 340 is positioned upstream from the depressurizer 350 and, thus, the depressurizer 350 is positioned downstream from the cooler 340. It should be understood that in some embodiments, the cooler 350 may be a heat exchanger that transfers heat from the supercritical water reactor effluent 102 to another, cooler stream, such as, for example, the water stream 101b. The depressurizer 350 is fluidly connected to the separator 120. The depressurizer 350 is positioned upstream from the separator 120 and, thus, the separator 120 is positioned downstream from the depressurizer 350. Although not shown in FIG. 3, as was shown in FIG. 1 and FIG. 2, the separator 120 is fluidly connected to a reformer. The separator 120 is positioned upstream from the reformer and, thus, the reformer is positioned downstream from the separator.

Figure 3:
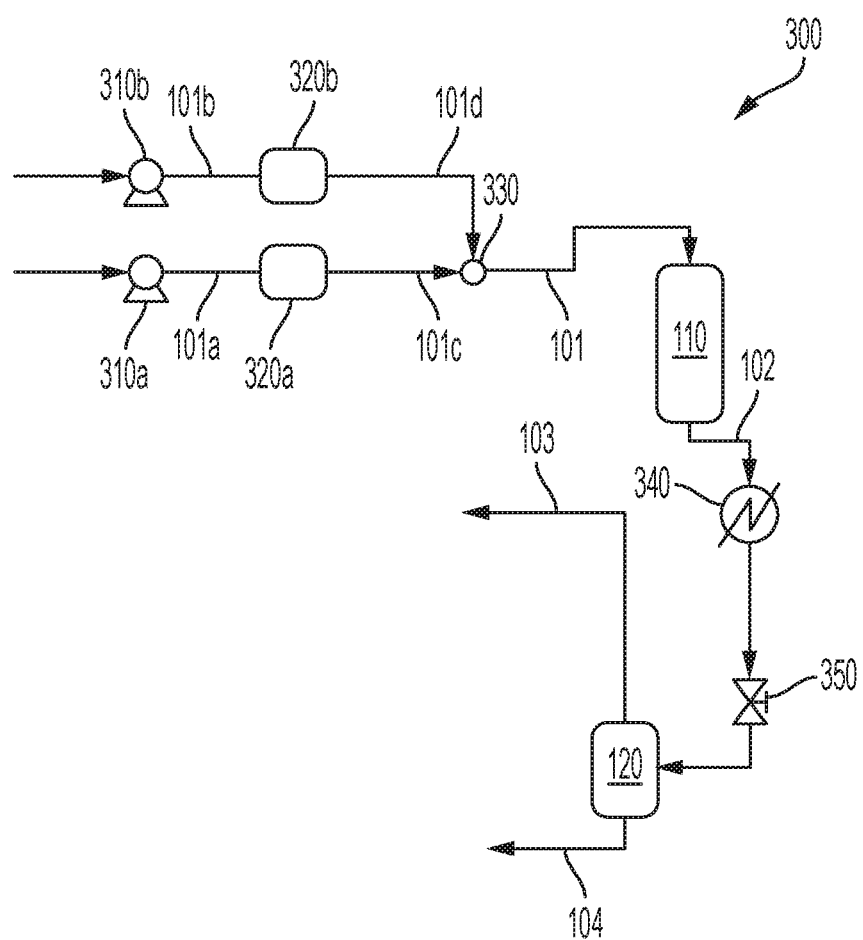
FIG. 3 is a process flow chart of processes according to one or more embodiments described in this disclosure.

According to embodiments as depicted in FIG. 3, the feed stream 101 is generated from two separate streams 101a and 101b. Stream 101a is a petroleum feedstock stream, and stream 101b is a water stream. The petroleum feedstock stream 101a is introduced into pump 310a, and the water stream 101b is introduced into pump 310b. Pump 310a and pump 310b can be used to increase in the pressure of the petroleum feedstock stream 101a and the water stream 101b, respectively. The pressurized petroleum feedstock stream 101a is transferred from pump 310a to pre-heater 320a, and the pressurized water stream 101b is transferred from pump 310b to pre-heater 320b. Pre-heater 320a and pre-heater 320b increase the temperature of the petroleum feedstock stream 101a and the water stream 101b, respectively. The pressurized, heated petroleum feedstock stream 101c is transferred from the pre-heater 320a to mixer 330, and the pressurized, heater water stream 101d is transferred from the pre-heater 320b to the mixer 330. At the mixer 330, the pressurized, heated petroleum feedstock stream 101c and the pressurized, heated water stream 101b are combined to form feed stream 101. Feed stream 101 is transferred from the mixer 330 to the supercritical water reactor 110. The feed stream 101 reacts with supercritical water in the supercritical water reactor 110 and exits the super critical water reactor 110 as supercritical water reactor effluent 102. The supercritical water reactor effluent 102 is introduced into a cooler 340, where the temperature of the supercritical water reactor effluent is reduced. The cooled supercritical water reactor effluent 102 is transferred from the cooler 340 to the depressurizer 350. At the depressurizer 350, the pressure of the cooled supercritical water effluent 102 is reduced. The cooled, depressurized supercritical water reactor effluent 102 is transferred from the depressurizer 350 to the separator 120. At the separator 120, the cooled, depressurized supercritical water reactor effluent 102 is separated into a light (e.g., vapor) stream 103 and a heavy (e.g., liquid) stream 104. Although not depicted in FIG. 3 (but as is shown in FIG. 1 and FIG. 2 and as discussed above), at least a portion of the light stream 103 is introduced to a reformer where the aromatics in the at least a portion of the light stream 103 are concentrated. The effluent from the reformer is then mixed with the heavy stream 104 to form a stable product stream.

As shown in the embodiments depicted by FIG. 3, the supercritical water reactor effluent 102 is separated into a light stream 103 and a heavy stream 104. The light stream is then subjected to reformation, such as catalytic reformation, in a reformer before being mixed back into the heavy stream 104. By separating the supercritical water reactor effluent 102, distillation unit is not required for processing the lighter fraction of the supercritical water reactor effluent 102. Moreover, by processing at least a portion of the light stream 103 in the reformer, a separate stabilizer is not needed for a stable product.

Details of the various process components, process streams, and process conditions provided herein above will be described in more detail.

In processes according to embodiments, a feed stream 101 is introduced into the supercritical water reactor 110. According to embodiments, the feed stream 101 comprises whole range crude oil, distilled crude oil, residue oil, topped crude oil, product streams from oil refineries, product streams from steam cracking processes, liquefied coals, liquid products recovered from oil or tar sands, bitumen, oil shale, asphaltenes, biomass hydrocarbons, liquid product from Gas-to-Liquid (GTL) process, and combinations thereof. The type and chemical makeup of the feed stream 101 will, according to embodiments, effect the final product stream, and may also dictate process conditions.

According to embodiments (in reference to ASTM D86, ASTM 1160, and/or ASTM 7169), the feed stream 101 has an atmospheric residue distillation point up to 5 volume percent (T5%) greater than 330° C., such as greater than 335° C., greater than 340° C., greater than 345° C., greater than 350° C., greater than 355° C., greater than 360° C., greater than 365° C., greater than 370° C., or greater than 375° C. In embodiments, the feed stream 101 has an atmospheric residue T5% that is greater than 330° C. and less than 400° C., such as greater than 340° C. and less than 400° C., greater than 350° C. and less than 400° C., greater than 360° C. and less than 400° C., greater than 370° C. and less than 400° C., greater than 380° C. and less than 400° C., greater than 390° C. and less than 400° C., greater than 330° C. and less than 390° C., than 340° C. and less than 390° C., greater than 350° C. and less than 390° C., greater than 360° C. and less than 390° C., greater than 370° C. and less than 390° C., greater than 380° C. and less than 390° C., greater than 330° C. and less than 380° C., than 340° C. and less than 380° C., greater than 350° C. and less than 380° C., greater than 360° C. and less than 380° C., greater than 370° C. and less than 380° C., greater than 330° C. and less than 370° C., than 340° C. and less than 370° C., greater than 350° C. and less than 370° C., greater than 360° C. and less than 370° C., greater than 330° C. and less than 360° C., than 340° C. and less than 360° C., greater than 350° C. and less than 360° C., greater than 330° C. and less than 350° C., than 340° C. and less than 350° C., or greater than 330° C. and less than 340° C.

In embodiments (in reference to ASTM D86, ASTM 1160, and/or ASTM 7169), the feed stream 101 has a vacuum residue with a T5% greater than 550° C., such as greater than 555° C., greater than 560° C., greater than 565° C., greater than 570° C., greater than 575° C., r greater than 580° C., greater than 585° C., greater than 590° C., or greater than 595° C. In one or more embodiments, the feed stream 101 has a vacuum residue with a T5% that is greater than 550° C. and less than 620° C., such as greater than 560° C. and less than 620° C., greater than 570° C. and less than 620° C., greater than 580° C. and less than 620° C., greater than 590° C. and less than 620° C., greater than 600° C. and less than 620° C., greater than 610° C. and less than 620° C., greater than 550° C. and less than 610° C., greater than 560° C. and less than 610° C., greater than 570° C. and less than 610° C., greater than 580° C. and less than 610° C., greater than 590° C. and less than 610° C., greater than 600° C. and less than 610° C., greater than 550° C. and less than 600° C., greater than 560° C. and less than 600° C., greater than 570° C. and less than 600° C., greater than 580° C. and less than 600° C., greater than 590° C. and less than 600° C., greater than 550° C. and less than 590° C., greater than 560° C. and less than 590° C., greater than 570° C. and less than 590° C., greater than 580° C. and less than 590° C., greater than 550° C. and less than 580° C., greater than 560° C. and less than 580° C., greater than 570° C. and less than 580° C., greater than 550° C. and less than 570° C., greater than 560° C. and less than 570° C., or greater than 550° C. and less than 560° C.

According to embodiments (in reference to ASTM D86, ASTM 1160, and/or ASTM 7169), the feed stream 101 has a vacuum gas oil (VGO) having a T5% that is greater than 330° C., such as greater than 335° C., greater than 340° C., greater than 345° C., greater than 350° C., greater than 355° C., greater than 360° C., greater than 365° C., greater than 370° C., or greater than 375° C. In embodiments, the feed stream 101 has an VGO T5% that is greater than 330° C. and less than 400° C., such as greater than 340° C. and less than 400° C., greater than 350° C. and less than 400° C., greater than 360° C. and less than 400° C., greater than 370° C. and less than 400° C., greater than 380° C. and less than 400° C., greater than 390° C. and less than 400° C., greater than 330° C. and less than 390° C., than 340° C. and less than 390° C., greater than 350° C. and less than 390° C., greater than 360° C. and less than 390° C., greater than 370° C. and less than 390° C., greater than 380° C. and less than 390° C., greater than 330° C. and less than 380° C., than 340° C. and less than 380° C., greater than 350° C. and less than 380° C., greater than 360° C. and less than 380° C., greater than 370° C. and less than 380° C., greater than 330° C. and less than 370° C., than 340° C. and less than 370° C., greater than 350° C. and less than 370° C., greater than 360° C. and less than 370° C., greater than 330° C. and less than 360° C., than 340° C. and less than 360° C., greater than 350° C. and less than 360° C., greater than 330° C. and less than 350° C., than 340° C. and less than 350° C., or greater than 330° C. and less than 340° C.

According to embodiments (in reference to ASTM D86, ASTM 1160, and/or ASTM 7169), the feed stream 101 has a VGO having a distillation point up to 95 volume percent (T95%) that is less than 595° C., such as less than 590° C., less than 585° C., less than 580° C., less than 575° C., less than 570° C., less than 565° C., or less than 560° C. In one or more embodiments, the feed stream 101 has a VGO T95% that is greater than 545° C. and less than 595° C., such as greater than 555° C. and less than 595° C., greater than 565° C. and less than 595° C., greater than 575° C. and less than 595° C., greater than 585° C. and less than 595° C., greater than 545° C. and less than 585° C., greater than 555° C. and less than 585° C., greater than 565° C. and less than 585° C., greater than 575° C. and less than 585° C., greater than 545° C. and less than 575° C., greater than 555° C. and less than 575° C., greater than 565° C. and less than 575° C., greater than 545° C. and less than 565° C., greater than 555° C. and less than 565° C., or greater than 545° C. and less than 555° C.

According to embodiments, the asphaltenes content of the feed stream 101, as measured by $C_7$-insolubles using standard IP-143 or ASTM D3279, is greater than 2 weight percent (wt. %), such as greater than 3 wt. %, greater than 4 wt. %, greater than 5 wt. %, greater than 6 wt. %, greater than 7 wt. %, greater than 8 wt. %, greater than 9 wt. %, or greater than 10 wt. %. According to one or more embodiments, the asphaltenes content of the feed stream 101, as measured by $C_7$-insolubles, is greater than 2 wt. % and less than 15 wt. %, such as greater than 3 wt. % and less than 15 wt. %, greater than 5 wt. % and less than 15 wt. %, greater than 8 wt. % and less than 15 wt. %, greater than 10 wt. % and less than 15 wt. %, greater than 12 wt. % and less than 15 wt. %, greater than 2 wt. % and less than 12 wt. %, greater than 3 wt. % and less than 12 wt. %, greater than 5 wt. % and less than 12 wt. %, greater than 8 wt. % and less than 12 wt. %, greater than 10 wt. % and less than 12 wt. %, greater than 2 wt. % and less than 10 wt. %, greater than 3 wt. % and less than 10 wt. %, greater than 5 wt. % and less than 10 wt. %, greater than 8 wt. % and less than 10 wt. %, greater than 2 wt. % and less than 8 wt. %, greater than 3 wt. % and less than 8 wt. %, greater than 5 wt. % and less than 8 wt. %, greater than 2 wt. % and less than 5 wt. %, greater than 3 wt. % and less than 5 wt. %, or greater than 2 wt. % and less than 3 wt. %.

In embodiments as depicted in FIG. 3, the feed stream 101 may be formed from a petroleum feedstock stream 101a and a water stream 101b. It should be understood that, when combined, the petroleum feedstock stream 101a and the water stream 101b has the properties described above for the feed stream 101. Thus, water may, in embodiments, be added to modify the properties of the petroleum feedstock stream to be within desired parameters.

According to embodiments, the water stream 101b may demineralized water having a conductivity of less than 1.0 microSiemens per centimeter (μS/cm), such as less than 0.8 μS/cm, less than 0.5 μS/cm, less than 0.2 μS/cm, or about 0.1 μS/cm. In one or more embodiments, the demineralized water has a conductivity greater than or equal to 0.1 μS/cm and less than 1.0 μS/cm, such as greater than 0.2 μS/cm and less than 1.0 μS/cm, greater than 0.5 μS/cm and less than 1.0 μS/cm, greater than 0.8 μS/cm and less than 1.0 μS/cm, greater than or equal to 0.1 μS/cm and less than 0.8 μS/cm, greater than 0.2 μS/cm and less than 0.8 μS/cm, greater than 0.5 μS/cm and less than 0.8 μS/cm, greater than or equal to 0.1 μS/cm and less than 0.5 μS/cm, greater than 0.2 μS/cm and less than 0.5 μS/cm, or greater than or equal to 0.1 μS/cm and less than 0.2 μS/cm.

According to embodiments, the demineralized water has a sodium content that is less than 5.0 micrograms per liter (μg/l), such as less than 4.5 μg/l, less than 4.0 μg/l, less than 3.5 μg/l, less than 3.0 μg/l, less than 2.5 μg/l, less than 2.0 μg/l, less than 1.5 μg/l, or about 1.0 μg/l. In one or more embodiments the demineralized water has a sodium content that is greater than or equal to 1.0 μg/l and less than 5.0 μg/l, such as greater than 2.0 μg/l and less than 5.0 μg/l, greater than 3.0 μg/l and less than 5.0 μg/l, greater than 4.0 μg/l and less than 5.0 μg/l, greater than or equal to 1.0 μg/l and less than 4.0 μg/l, greater than 2.0 μg/l and less than 4.0 μg/l, greater than 3.0 μg/l and less than 4.0 μg/l, greater than or equal to 1.0 μg/l and less than 3.0 μg/l, greater than 2.0 μg/l and less than 3.0 μg/l, or greater than or equal to 1.0 μg/l and less than 2.0 μg/l.

According to embodiments, the demineralized water has a chloride content that is less than 5.0 μg/l, such as less than 4.5 μg/l, less than 4.0 μg/l, less than 3.5 μg/l, less than 3.0 μg/l, less than 2.5 μg/l, less than 2.0 μg/l, less than 1.5 μg/l, or about 1.0 μg/l. In one or more embodiments the demineralized water has a chloride content that is greater than or equal to 1.0 μg/l and less than 5.0 μg/l, such as greater than 2.0 μg/l and less than 5.0 μg/l, greater than 3.0 μg/l and less than 5.0 μg/l, greater than 4.0 μg/l and less than 5.0 μg/l, greater than or equal to 1.0 μg/l and less than 4.0 μg/l, greater than 2.0 μg/l and less than 4.0 μg/l, greater than 3.0 μg/l and less than 4.0 μg/l, greater than or equal to 1.0 μg/l and less than 3.0 μg/l, greater than 2.0 μg/l and less than 3.0 μg/l, or greater than or equal to 1.0 μg/l and less than 2.0 μg/l.

According to embodiments, the demineralized water has a silica content that is less than 3.0 μg/l, such as less than 2.5 μg/l, less than 2.0 μg/l, less than 1.5 μg/l, less than 1.0 μg/l, or less than 0.5 μg/l. In one or more embodiments the demineralized water has a silica content that greater than or equal to 0.0 μg/l and less than 3.0 μg/l, such as greater than 1.0 μg/l and less than 3.0 μg/l, greater than 2.0 μg/l and less than 3.0 μg/l, greater than or equal to 0.0 μg/l and less than 2.0 μg/l, greater than 1.0 μg/l and less than 2.0 μg/l, or greater than or equal to 0.0 μg/l and less than 1.0 μg/l.

In embodiments where the feed stream 101 is formed from a petroleum feedstock stream 101a and a water stream 101b, such as in embodiments as depicted in FIG. 3, a ratio of the volumetric flow rate-at standard atmospheric temperature and pressure-of the water stream 101b and the petroleum feedstock stream 101a is from 1.0:10.0 to 1.0:0.1 at SATP, such as from 1.0:9.0 to 1.0:0.1, from 1.0:8.0 to 1.0:0.1, from 1.0:7.0 to 1.0:0.1, from 1.0:6.0 to 1.0:0.1, from 1.0:5.0 to 1.0:0.1, from 1.0:4.0 to 1.0:0.1, from 1.0:3.0 to 1.0:0.1, from 1.0:2.0 to 1.0:0.1, from 1.0:1.0 to 1.0:0.1, from 1.0:0.5 to 1.0:0.1, from 1.0:10.0 to 1.0:0.5, from 1.0:9.0 to 1.0:0.5, from 1.0:8.0 to 1.0:0.5, from 1.0:7.0 to 1.0:0.5, from 1.0:6.0 to 1.0:0.5, from 1.0:5.0 to 1.0:0.5, from 1.0:4.0 to 1.0:0.5, from 1.0:3.0 to 1.0:0.5, from 1.0:2.0 to 1.0:0.5, from 1.0:1.0 to 1.0:0.5, from 1.0:10.0 to 1.0:1.0, from 1.0:9.0 to 1.0:1.0, from 1.0:8.0 to 1.0:1.0, from 1.0:7.0 to 1.0:1.0, from 1.0:6.0 to 1.0:1.0, from 1.0:5.0 to 1.0:1.0, from 1.0:4.0 to 1.0:1.0, from 1.0:3.0 to 1.0:1.0, from 1.0:2.0 to 1.0:1.0, from 1.0:10.0 to 1.0:2.0, from 1.0:9.0 to 1.0:2.0, from 1.0:8.0 to 1.0:2.0, from 1.0:7.0 to 1.0:2.0, from 1.0:6.0 to 1.0:2.0, from 1.0:5.0 to 1.0:2.0, from 1.0:4.0 to 1.0:2.0, from 1.0:3.0 to 1.0:2.0, from 1.0:10.0 to 1.0:3.0, from 1.0:9.0 to 1.0:3.0, from 1.0:8.0 to 1.0:3.0, from 1.0:7.0 to 1.0:3.0, from 1.0:6.0 to 1.0:3.0, from 1.0:5.0 to 1.0:3.0, from 1.0:4.0 to 1.0:3.0, from 1.0:10.0 to 1.0:4.0, from 1.0:9.0 to 1.0:4.0, from 1.0:8.0 to 1.0:4.0, from 1.0:7.0 to 1.0:4.0, from 1.0:6.0 to 1.0:4.0, from 1.0:5.0 to 1.0:4.0, from 1.0:10.0 to 1.0:5.0, from 1.0:9.0 to 1.0:5.0, from 1.0:8.0 to 1.0:5.0, from 1.0:7.0 to 1.0:5.0, from 1.0:6.0 to 1.0:5.0, from 1.0:10.0 to 1.0:6.0, from 1.0:9.0 to 1.0:6.0, from 1.0:8.0 to 1.0:6.0, from 1.0:7.0 to 1.0:6.0, from 1.0:10.0 to 1.0:7.0, from 1.0:9.0 to 1.0:7.0, from 1.0:8.0 to 1.0:7.0, from 1.0:10.0 to 1.0:8.0, from 1.0:9.0 to 1.0:8.0, or from 1.0:10.0 to 1.0:9.0.

In addition to the composition of the feed stream 101, the temperature and pressure of the feed stream can have an effect on the performance of the reactions that take place in the supercritical water reactor 110.

In embodiments where the feed steam 101 is formed from a petroleum feedstock stream 101a and a water stream 101b (such as in embodiments depicted in FIG. 3), before being mixed in the mixer 330, the water stream 101b may be pre-heated to a temperature that is greater than 375° C. and less than 600° C., such as greater than 400° C. and less than 600° C., greater than 425° C. and less than 600° C., greater than 450° C. and less than 600° C., greater than 475° C. and less than 600° C., greater than 500° C. and less than 600° C., greater than 525° C. and less than 600° C., greater than 550° C. and less than 600° C., greater than 575° C. and less than 600° C., greater than 375° C. and less than 575° C., greater than 400° C. and less than 575° C., greater than 425° C. and less than 575° C., greater than 450° C. and less than 575° C., greater than 475° C. and less than 575° C., greater than 500° C. and less than 575° C., greater than 525° C. and less than 575° C., greater than 550° C. and less than 575° C., greater than 375° C. and less than 550° C., greater than 400° C. and less than 550° C., greater than 425° C. and less than 550° C., greater than 450° C. and less than 550° C., greater than 475°

C. and less than 550° C., greater than 500° C. and less than 550° C., greater than 525° C. and less than 550° C., greater than 375° C. and less than 525° C., greater than 400° C. and less than 525° C., greater than 425° C. and less than 525° C., greater than 450° C. and less than 525° C., greater than 475° C. and less than 525° C., greater than 500° C. and less than 525° C., greater than 375° C. and less than 500° C., greater than 400° C. and less than 500° C., greater than 425° C. and less than 500° C., greater than 450° C. and less than 500° C., greater than 475° C. and less than 500° C., greater than 375° C. and less than 475° C., greater than 400° C. and less than 475° C., greater than 425° C. and less than 475° C., greater than 450° C. and less than 475° C., greater than 375° C. and less than 450° C., greater than 400° C. and less than 450° C., greater than 425° C. and less than 450° C., greater than 375° C. and less than 425° C., greater than 400° C. and less than 425° C., or greater than 375° C. and less than 400° C.

In embodiments where the feed steam 101 is formed from a petroleum feedstock stream 101a and a water stream 101b (such as in embodiments depicted in FIG. 3), before being mixed in the mixer 330, the petroleum feedstock stream 101a may be pre-heated to a temperature that is greater than 50° C. and less than 300° C., such as greater than 100° C. and less than 300° C., greater than 150° C. and less than 300° C., greater than 200° C. and less than 300° C., greater than 250° C. and less than 300° C., greater than 50° C. and less than 250° C., greater than 100° C. and less than 250° C., greater than 150° C. and less than 250° C., greater than 200° C. and less than 250° C., greater than 50° C. and less than 200° C., greater than 100° C. and less than 200° C., greater than 150° C. and less than 200° C., greater than 50° C. and less than 150° C., greater than 100° C. and less than 150° C., or greater than 50° C. and less than 100° C.

Whether the feed steam 101 is formed from a petroleum feedstock stream 101a and a water stream 101b (such as in embodiments depicted in FIG. 3) or is a single feed stream (such as in embodiments depicted in FIG. 1 and FIG. 2), the feed stream 101 entering the supercritical water reactor 110 has a pressure that is greater than 20 megapascals (MPa), such as greater than 21 MPa, greater than 22 MPa, greater than 23 MPa, greater than 24 MPa, greater than 25 MPa, greater than 26 MPa, or greater than 27 MPa. In one or more embodiments, the feed stream 101 entering the supercritical water reactor 110 has a pressure that is greater than 20 MPa and less than 35 MPa, such as greater than 23 MPa and less than 35 MPa, greater than 25 MPa and less than 35 MPa, greater than 27 MPa and less than 35 MPa, greater than 30 MPa and less than 35 MPa, greater than 33 MPa and less than 35 MPa, greater than 20 MPa and less than 33 MPa, greater than 23 MPa and less than 33 MPa, greater than 25 MPa and less than 33 MPa, greater than 27 MPa and less than 33 MPa, greater than 30 MPa and less than 33 MPa, greater than 20 MPa and less than 30 MPa, greater than 23 MPa and less than 30 MPa, greater than 25 MPa and less than 30 MPa, greater than 27 MPa and less than 30 MPa, greater than 20 MPa and less than 27 MPa, greater than 23 MPa and less than 27 MPa, greater than 25 MPa and less than 27 MPa, greater than 20 MPa and less than 25 MPa, greater than 23 MPa and less than 25 MPa, or greater than 20 MPa and less than 23 MPa.

As described above, the feed stream 101 is introduced into the supercritical water reactor 110, where the feed stream 101 reacts with the supercritical water in the supercritical water reactor 110. The reactions in supercritical water can be classified as a thermal cracking process where supercritical water is diluent and a source of hydrogen. Although supercritical water reactions process much smaller amounts of coke than conventional coking process, hydrogen deficiency in the reaction medium results in unsaturated bonds in the product. Also, paraffinic portion of product, some of which is the cracking product from alkylated aromatics, destabilizes asphaltenes in the product.

In particular, and according to one or more embodiments, in the supercritical water reactor 110, reactions in the presence of the supercritical water undergo radical chain reactions. Without being bound by any particular theory, it is believed that various bonds in the feed stream 101 crack quickly after being introduced to a supercritical water reactor due to the thermal energy present in the supercritical water. Carbon-heteroatom bonds, like carbon-sulfur bonds, including thiols and sulfides, carbon-nitrogen bonds, carbon-metal bonds, and weak carbon-carbon bonds are easily broken and generate radicals. The radicals of the broken bonds initiate the radical chain reaction. Radicals on molecules are propagated to other molecules, which results in rearrangement of the molecular structure of the molecules to achieve cracking, oligomerization, isomerization, dehydrogenation, cyclization, aromatization, and other reactions. However, the order and nature of the products of upgrading reactions are sensitive to the operating conditions of the reactor and, therefore, are difficult to predict. Aromatic compounds, especially light aromatics such as benzene, toluene, and xylene (BTX) are self-inhibitors. That is, the delocalization of the radical by the aromatic structure causes a decrease in the concentration of radicals and an increase in the termination step.

The type of reactor used as the supercritical water reactor 110 is not particularly limited. In embodiments, the supercritical water reactor 110 may be a vessel or a tubular reactor. It should be understood that the size and specific shape of the supercritical water reactor 110 will be determined to balance the amount of material to be reacted and the reaction conditions needed. The temperature and pressure in the supercritical water reactor 110 will affect the reactions that occur therein. The pressure within the supercritical water reactor 110 will, primarily, be determined by the pressure of the feed stream 101 that enters the supercritical water reactor 110 and any restraints on the pressure of the supercritical water reactor effluent 102. For instance, as shown in FIG. 3, a depressurizer 350 is positioned downstream from the supercritical water reactor 110. In such embodiments, pressure is relatively constant from the pumps 310a and 310b to the depressurizer 350. Thus, in embodiments, the pressure in the supercritical water reactor 110 is the same as the pressure of the feed stream 101 that enters the supercritical water reactor 110, such as the pressures disclosed hereinabove.

Similarly as the pressure, the temperature within the supercritical water reactor 110 is determined by the temperature of feed stream 101 that enters the supercritical water reactor 110 and the temperature of the supercritical water reactor effluent 102. By regulating the temperatures of these two streams, the temperature within the supercritical water reactor 110 may be regulated. For instance, and as shown in the embodiments depicted in FIG. 3, pre-heater 320a and pre-heater 320b can be used to regulate the temperature of the feed stream 101, and cooler 340 can be used to regulate the temperature of the supercritical water reactor effluent 105.

According to embodiments, the temperature within the supercritical water reactor 110 is greater than 350° C. and less than 600° C., such as greater than 380° C. and less than 600° C., greater than 400° C. and less than 600° C., greater than 450° C. and less than 600° C., greater than 500° C. and less than 600° C., greater than 550° C. and less than 600° C., greater than 350° C. and less than 550° C., greater than 380° C. and less than 550° C., greater than 400° C. and less than 550° C., greater than 450° C. and less than 550° C., greater than 500° C. and less than 550° C., greater than 350° C. and less than 500° C., greater than 380° C. and less than 500° C., greater than 400° C. and less than 500° C., greater than 450° C. and less than 500° C., greater than 350° C. and less than 450° C., greater than 380° C. and less than 450° C., greater than 400° C. and less than 450° C., greater than 350° C. and less than 400° C., greater than 380° C. and less than 400° C., or greater than 350° C. and less than 380° C.

In addition to the temperature and pressure within the supercritical water reactor 110, the duration that the reactants are present in the supercritical water reactor 110 (also referred to as residence time) will affect the reactions that occur within the supercritical water reactor 110. The duration is calculated based on an assumption that the density of the reactants in the supercritical water reactor 110 is the same as the density of water at the reaction conditions within the supercritical water reactor 110. According to embodiments, the duration that the reactants are present in the supercritical water reactor 110 is greater than 10 seconds and less than 60 minutes, such as greater than 30 seconds and less than 60 minutes, greater than 1 minute and less than 60 minutes, greater than 10 minutes and less than 60 minutes, greater than 15 minutes and less than 60 minutes, greater than 30 minutes and less than 60 minutes, greater than 45 minutes and less than 60 minutes, greater than 10 seconds and less than 45 minutes, greater than 30 seconds and less than 45 minutes, greater than 1 minute and less than 45 minutes, greater than 10 minutes and less than 45 minutes, greater than 15 minutes and less than 45 minutes, greater than 30 minutes and less than 45 minutes, greater than 10 seconds and less than 30 minutes, greater than 30 seconds and less than 30 minutes, greater than 1 minute and less than 30 minutes, greater than 10 minutes and less than 30 minutes, greater than 15 minutes and less than 30 minutes, greater than 10 seconds and less than 15 minutes, greater than 30 seconds and less than 15 minutes, greater than 1 minute and less than 15 minutes, greater than 10 minutes and less than 15 minutes, greater than 10 seconds and less than 10 minutes, greater than 30 seconds and less than 10 minutes, greater than 1 minute and less than 10 minutes, greater than 10 seconds and less than 1 minute, greater than 30 seconds and less than 1 minute, or greater than 10 seconds and less than 30 seconds.

The reaction product from the supercritical water reactor 110 exits the supercritical water reactor 110 as the supercritical water reactor effluent stream 102 and is introduced to the separator 120. Any conventional separator may be used. According to embodiments, the separator may be a fractionator or the like. As described above, and as shown in embodiments depicted in FIG. 1, FIG. 2, and FIG. 3, the separator 120 splits the supercritical water reactor effluent stream 102 into two streams. The light (e.g., vapor) stream 103 contains most of the water from the supercritical water reactor effluent stream 102, while the heavy (e.g., liquid) stream is almost dry. In embodiments, the light stream 103 comprises greater than 90 wt. % of the water from the supercritical water reactor effluent stream 102, such as greater than 92 wt. %, greater than 95 wt. %, greater than 97 wt. %, or greater than 99 wt. %. The process conditions within the separator 120 are selected to maximize paraffins, olefins, naphthenes, and light aromatics fractions in the light stream 103. The paraffins, olefins, naphthenes, and light aromatics that are present in the light stream 103 have carbon number lower than 12, for example, dodecane ($C_{12}H_{26}$) that has boiling point of 216° C. The paraffins, olefins, naphthenes, and light aromatics present in the light stream 103 may, according to embodiments be present in a petroleum phase of the light stream that can be separated from water present in the light stream 103.

To moderate the temperature and pressure within the separator 120, the temperature and pressure of the supercritical water reactor effluent stream 102 may be modified. For instance, in embodiments depicted in FIG. 3, the temperature of the supercritical water reactor effluent stream 102 may be regulated by the cooler 340, and the pressure of the supercritical water reactor effluent stream 102 may be regulated by the depressurizer 350. It should be understood that the temperature and pressure of the supercritical water reactor effluent stream 102 before it enters the separator 120—and thereby the temperature and pressure within the separator—is selected based on the balance of materials within the supercritical water reactor effluent stream 102 and the desired components of the light stream 103.

In embodiments, a water-oil separator may be used to separate the petroleum phase in the light stream 103 and the water in the light stream 103. Any suitable, known water-oil separator can be used. In embodiments, the water-oil oil separator is internal to the separator 120. However, in other embodiments, the water-oil separator is external (not shown) to the separator 120. Components, such as the petroleum phase, of the light stream 103 are introduced into a reformer 130 to concentrate the aromatics within the components of the light stream 103 sent to the reformer. Although FIG. 3 does not explicitly show a reformer, in the embodiments depicted in FIG. 3, components of the light stream 103 are transferred from the separator 120 to a reformer. The type of reformer used in embodiments is not particularly limited and, in one or more embodiments, the reformer 130 may be a catalytic reformer. For instance, in one or more embodiments, the reformer 130 may be catalytic reformer comprising a platinum-rhenium (Pt—Re) catalyst or a catalytic reformer comprising a platinum-tin (Pt—Sn) catalyst supported on an alumina-($Al_2O_3$) based support. In embodiments, the alumina-based support may have a microporous structure.

Certain components that may be present in the light stream 103 may be detrimental to the catalysts in the reformer. For instance, water and sulfur can poison traditional reformation catalysts, such as, for example Pt—Re or Pt—Sn catalysts. Accordingly, the content of water and sulfur that enter the reformer 130 should, according to embodiments be limited. A large portion of the water initially present in the light stream 102 may be removed in the separator 120 to produce stream 103. As shown in embodiments depicted in FIG. 2, sulfur present in the light stream may be removed by a desulfurization unit 210 before it enters the reformer 130. It should be understood that a desulfurization unit 210 may be positioned upstream from the reformer 130 in any embodiment disclosed and described herein, and the desulfurization unit 210 is not explicitly limited to embodiments depicted in FIG. 2. The content of sulfur entering the reformer 130 and the desulfurization unit 210 will be described in more detail below.

According to embodiments, the at least a portion of the light stream 103 entering the reformer 130 has a water content that is less than 10 parts per million by weight percent (wt. % ppm), such as less than 9 wt. % ppm, less than 8 wt. % ppm, less than 7 wt. % ppm, less than 6 wt. % ppm, less than 5 wt. % ppm, less than 4 wt. % ppm, less than 2 wt. % ppm, or less than 1 wt. % ppm. According to one or more embodiments, the components of the light stream 103 entering the reformer 130 has a water content that is greater than 1 wt. % ppm and less than 10 wt. % ppm, greater than 3 wt. % ppm and less than 10 wt. % ppm, greater than 5 wt. % ppm and less than 10 wt. % ppm, greater than 8 wt. % ppm and less than 10 wt. % ppm, greater than 1 wt. % ppm and less than 8 wt. % ppm, greater than 3 wt. % ppm and less than 8 wt. % ppm, greater than 5 wt. % ppm and less than 8 wt. % ppm, greater than 1 wt. % ppm and less than 5 wt. % ppm, greater than 3 wt. % ppm and less than 5 wt. % ppm, or greater than 1 wt. % ppm and less than 3 wt. % ppm.

The temperature within the reformer 130 may also have an effect on the concentration of aromatics that takes place in the reformer 130. According to embodiments, the temperature within the reformer is greater than 430° C. and less than 550° C., such as greater than 475° C. and less than 550° C., greater than 500° C. and less than 550° C., greater than 525° C. and less than 550° C., greater than 450° C. and less than 525° C., greater than 475° C. and less than 525° C., greater than 500° C. and less than 525° C., greater than 450° C. and less than 500° C., greater than 475° C. and less than 500° C., or greater than 450° C. and less than 475° C.

According to embodiments, the pressure within the reformer 130 is greater than 0.3 MPa and less than 4.0 MPa, such as greater than 0.5 MPa and less than 4.0 MPa, greater than 1.0 MPa and less than 4.0 MPa, greater than 1.5 MPa and less than 4.0 MPa, greater than 2.0 MPa and less than 4.0 MPa, greater than 2.5 MPa and less than 4.0 MPa, greater than 3.0 MPa and less than 4.0 MPa, greater than 3.5 MPa and less than 4.0 MPa, greater than 0.3 MPa and less than 3.5 MPa, greater than 0.5 MPa and less than 3.5 MPa, greater than 1.0 MPa and less than 3.5 MPa, greater than 1.5 MPa and less than 3.5 MPa, greater than 2.0 MPa and less than 3.5 MPa, greater than 2.5 MPa and less than 3.5 MPa, greater than 3.0 MPa and less than 3.5 MPa, greater than 0.3 MPa and less than 3.0 MPa, greater than 0.5 MPa and less than 3.0 MPa, greater than 1.0 MPa and less than 3.0 MPa, greater than 1.5 MPa and less than 3.0 MPa, greater than 2.0 MPa and less than 3.0 MPa, greater than 2.5 MPa and less than 3.0 MPa, greater than 0.3 MPa and less than 2.5 MPa, greater than 0.5 MPa and less than 2.5 MPa, greater than 1.0 MPa and less than 2.5 MPa, greater than 1.5 MPa and less than 2.5 MPa, greater than 2.0 MPa and less than 2.5 MPa, greater than 0.3 MPa and less than 2.0 MPa, greater than 0.5 MPa and less than 2.0 MPa, greater than 1.0 MPa and less than 2.0 MPa, greater than 1.5 MPa and less than 2.0 MPa, greater than 0.3 MPa and less than 1.5 MPa, greater than 0.5 MPa and less than 1.5 MPa, greater than 1.0 MPa and less than 1.5 MPa, greater than 0.3 MPa and less than 1.0 MPa, greater than 0.5 MPa and less than 1.0 MPa, or greater than 0.3 MPa and less than 0.5 MPa.

According to embodiments, the flow rate in liquid hourly space velocity (LHSV) of components of the light stream 103 in the reformer 130 is greater than 1.0/hour (hr) and less than 4.0/hr, such as greater than 1.5/hr and less than 4.0/hr, greater than 2.0/hr and less than 4.0/hr, greater than 2.5/hr and less than 4.0/hr, greater than 3.0/hr and less than 4.0/hr, greater than 3.5/hr and less than 4.0/hr, greater than 1.0/hr and less than 3.5/hr, greater than 1.5/hr and less than 3.5/hr, greater than 2.0/hr and less than 3.5/hr, greater than 2.5/hr and less than 3.5/hr, greater than 3.0/hr and less than 3.5/hr, greater than 1.0/hr and less than 3.0/hr, greater than 1.5/hr and less than 3.0/hr, greater than 2.0/hr and less than 3.0/hr, greater than 2.5/hr and less than 3.0/hr, greater than 1.0/hr and less than 2.5/hr, greater than 1.5/hr and less than 2.5/hr, greater than 2.0/hr and less than 2.5/hr, greater than 1.0/hr and less than 2.0/hr, greater than 1.5/hr and less than 2.0/hr, or greater than 1.0/hr and less than 1.5/hr. If the flow rate is too high, the aromatics will not be sufficiently concentrated, and if the flow rate is too low, the catalyst will be spent too quickly.

The molar ratio of hydrogen ($H_2$) to feed oil (stream 103) within the reformer is greater than 1 and less than 10, such as greater than 2 and less than 10, greater than 3 and less than 10, greater than 4 and less than 10, greater than 5 and less than 10, greater than 6 and less than 10, greater than 7 and less than 10, greater than 8 and less than 10, greater than 9 and less than 10, greater than 1 and less than 9, greater than 2 and less than 9, greater than 3 and less than 9, greater than 4 and less than 9, greater than 5 and less than 9, greater than 6 and less than 9, greater than 7 and less than 9, greater than 8 and less than 9, greater than 1 and less than 8, greater than 2 and less than 8, greater than 3 and less than 8, greater than 4 and less than 8, greater than 5 and less than 8, greater than 6 and less than 8, greater than 7 and less than 8, greater than 1 and less than 7, greater than 2 and less than 7, greater than 3 and less than 7, greater than 4 and less than 7, greater than 5 and less than 7, greater than 6 and less than 7, greater than 1 and less than 6, greater than 2 and less than 6, greater than 3 and less than 6, greater than 4 and less than 6, greater than 5 and less than 6, greater than 1 and less than 5, greater than 2 and less than 5, greater than 3 and less than 5, greater than 4 and less than 5, greater than 1 and less than 4, greater than 2 and less than 4, greater than 3 and less than 4, greater than 1 and less than 3, greater than 2 and less than 3, or greater than 1 and less than 2. By keeping the hydrogen content in excess of the hydrocarbons, the generated hydrocarbon radicals and olefins are saturated.

As described above, sulfur can poison the catalyst in the reformer 130. Accordingly, the content of sulfur, which herein includes sulfur-containing components, in the stream being introduced into the reformer should be kept low. Accordingly, in embodiments, the concentration of sulfur in the stream being introduced into the reformer 130 is less than 0.7 wt. % ppm, such as less than 0.6 wt. % ppm, less than 0.5 wt. % ppm, less than 0.4 wt. % ppm, less than 0.3 wt. % ppm, or less than 0.2 wt. % ppm. In one or more embodiments, the concentration of sulfur in the stream being introduced into the reformer 130 is greater than 0.1 wt. % ppm and less than 0.7 wt. % ppm, such as greater than 0.2 wt. % ppm and less than 0.7 wt. % ppm, greater than 0.3 wt. % ppm and less than 0.7 wt. % ppm, greater than 0.4 wt. % ppm and less than 0.7 wt. % ppm, greater than 0.5 wt. % ppm and less than 0.7 wt. % ppm, greater than 0.6 wt. % ppm and less than 0.7 wt. % ppm, greater than 0.1 wt. % ppm and less than 0.6 wt. % ppm, greater than 0.2 wt. % ppm and less than 0.6 wt. % ppm, greater than 0.3 wt. % ppm and less than 0.6 wt. % ppm, greater than 0.4 wt. % ppm and less than 0.6 wt. % ppm, greater than 0.5 wt. % ppm and less than 0.6 wt. % ppm, greater than 0.1 wt. % ppm and less than 0.5 wt. % ppm, greater than 0.2 wt. % ppm and less than 0.5 wt. % ppm, greater than 0.3 wt. % ppm and less than 0.5 wt. % ppm, greater than 0.4 wt. % ppm and less than 0.5 wt. % ppm, greater than 0.1 wt. % ppm and less than 0.4 wt. % ppm, greater than 0.2 wt. % ppm and less than 0.4 wt. % ppm, greater than 0.3 wt. % ppm and less than 0.4 wt. % ppm, greater than 0.1 wt. % ppm and less than 0.3 wt. % ppm, greater than 0.2 wt. % ppm and less than 0.3 wt. % ppm, or greater than 0.1 wt. % ppm and less than 0.2 wt. % ppm.

The content of sulfur in the components of the light stream 103 entering the reformer may, according to embodiments, be reduced by a desulfurization unit 210, as described above. The type desulfurization unit 210 is not particularly limited. In embodiments, the desulfurization unit 210 is a conventional hydrodesulfurization unit. In such units, caustic treatment or adsorptive desulfurization (such as disclosed in U.S. Patent Application Publication No. 2009/0145807) can be employed. Catalytic hydrodesulfurization can be used in one or more embodiments because catalytic hydrodesulfurization saturates olefins, which are good feed molecules for reforming unit. No specific requirements to achieve goal of this invention.

According to embodiments, the catalyst in the desulfurization unit may include a cobalt molybdenum (CoMo) catalyst or a nickel molybdenum (NiMo) catalyst on an alumina-based support. According to embodiments, the alumina-based support may be a microporous alumina-based support.

The temperature within the desulfurization unit 210 may also have an effect on the amount of sulfur that is present in the feed stream introduced to the reformer 130. According to embodiments, the temperature within the desulfurization unit 210 is greater than 250° C. and less than 350° C., such as greater than 275° C. and less than 350° C., greater than 300° C. and less than 350° C., greater than 325° C. and less than 350° C., greater than 250° C. and less than 325° C., greater than 275° C. and less than 325° C., greater than 300° C. and less than 325° C., greater than 250° C. and less than 300° C., greater than 275° C. and less than 300° C., or greater than 250° C. and less than 275° C.

According to embodiments, the pressure within the desulfurization unit 210 can affect the amount of sulfur in the feed stream that is introduced into the reformer 130. In embodiments, the pressure within the desulfurization unit 210 is greater than 0.3 MPa and less than 3.0 MPa, greater than 0.5 MPa and less than 3.0 MPa, greater than 1.0 MPa and less than 3.0 MPa, greater than 1.5 MPa and less than 3.0 MPa, greater than 2.0 MPa and less than 3.0 MPa, greater than 2.5 MPa and less than 3.0 MPa, greater than 0.3 MPa and less than 2.5 MPa, greater than 0.5 MPa and less than 2.5 MPa, greater than 1.0 MPa and less than 2.5 MPa, greater than 1.5 MPa and less than 2.5 MPa, greater than 2.0 MPa and less than 2.5 MPa, greater than 0.3 MPa and less than 2.0 MPa, greater than 0.5 MPa and less than 2.0 MPa, greater than 1.0 MPa and less than 2.0 MPa, greater than 1.5 MPa and less than 2.0 MPa, greater than 0.3 MPa and less than 1.5 MPa, greater than 0.5 MPa and less than 1.5 MPa, greater than 1.0 MPa and less than 1.5 MPa, greater than 0.3 MPa and less than 1.0 MPa, greater than 0.5 MPa and less than 1.0 MPa, or greater than 0.3 MPa and less than 0.5 MPa.

According to embodiments, the flow rate in LHSV of components of the light stream 103 in the desulfurization unit 210 is greater than 1.0/hr and less than 8.0/hr, such as greater than 2.0/hr and less than 8.0/hr, greater than 3.0/hr and less than 8.0/hr, greater than 4.0/hr and less than 8.0/hr, greater than 5.0/hr and less than 8.0/hr, greater than 6.0/hr and less than 8.0/hr, greater than 7.0/hr and less than 8.0/hr, greater than 1.0/hr and less than 7.0/hr, greater than 2.0/hr and less than 7.0/hr, greater than 3.0/hr and less than 7.0/hr, greater than 4.0/hr and less than 7.0/hr, greater than 5.0/hr and less than 7.0/hr, greater than 6.0/hr and less than 7.0/hr, greater than 1.0/hr and less than 6.0/hr, greater than 2.0/hr and less than 6.0/hr, greater than 3.0/hr and less than 6.0/hr, greater than 4.0/hr and less than 6.0/hr, greater than 5.0/hr and less than 6.0/hr, greater than 1.0/hr and less than 5.0/hr, greater than 2.0/hr and less than 5.0/hr, greater than 3.0/hr and less than 5.0/hr, greater than 4.0/hr and less than 5.0/hr, greater than 1.0/hr and less than 4.0/hr, greater than 2.0/hr and less than 4.0/hr, greater than 3.0/hr and less than 4.0/hr, greater than 1.0/hr and less than 3.0/hr, greater than 2.0/hr and less than 3.0/hr, greater than 1.0/hr and less than 2.0/hr. If the flow rate is too high, the aromatics will not be sufficiently concentrated, and if the flow rate is too low, the catalyst will be spent too quickly.

The molar ratio of hydrogen ($H_2$) to feed oil (stream 103) within the desulfurization unit 210 is greater than 30 normal cubic meter per cubic meter ($NM^3/m^3$) and less than 60 $NM^3/m^3$, such as from 35 $NM^3/m^3$ and less than 60 $NM^3/m^3$, from 40 $NM^3/m^3$ and less than 60 $NM^3/m^3$, from 45 $NM^3/m^3$ and less than 60 $NM^3/m^3$, from 50 $NM^3/m^3$ and less than 60 $NM^3/m^3$, from 55 $NM^3/m^3$ and less than 60 $NM^3/m^3$, from 30 $NM^3/m^3$ and less than 55 $NM^3/m^3$, from 35 $NM^3/m^3$ and less than 55 $NM^3/m^3$, from 40 $NM^3/m^3$ and less than 55 $NM^3/m^3$, from 45 $NM^3/m^3$ and less than 55 $NM^3/m^3$, from 50 $NM^3/m^3$ and less than 55 $NM^3/m^3$, from 30 $NM^3/m^3$ and less than 50 $NM^3/m^3$, from 35 $NM^3/m^3$ and less than 50 $NM^3/m^3$, from 40 $NM^3/m^3$ and less than 50 $NM^3/m^3$, from 45 $NM^3/m^3$ and less than 50 $NM^3/m^3$, from 30 $NM^3/m^3$ and less than 45 $NM^3/m^3$, from 35 $NM^3/m^3$ and less than 45 $NM^3/m^3$, from 40 $NM^3/m^3$ and less than 45 $NM^3/m^3$, from 30 $NM^3/m^3$ and less than 40 $NM^3/m^3$, from 35 $NM^3/m^3$ and less than 40 $NM^3/m^3$, or from 30 $NM^3/m^3$ and less than 35 $NM^3/m^3$. By keeping the hydrogen content in excess of the hydrocarbons, the generated hydrocarbon radicals and olefins are saturated.

As described in detail above with reference to various embodiments of processes to improve the stability of thermally cracked petroleum products, by increasing severity of supercritical water reactions in the supercritical water reactor 110 (e.g., conducting reactions at high temperature and with long durations), the extent of upgrading of a petroleum feedstock is increased (e.g., the upgraded petroleum feed stock will have a higher American Petroleum Institute (API) gravity, lower residue fraction, lower sulfur content, lower metal content, and the like). However, these intense reactions with supercritical water cause an increased paraffin ($C_5$-$C_{12}$) content that destabilizes asphaltenes fraction in the product, which can result in an unstable final product. Although supercritical water processes generally reduce the asphaltenes content by decomposing it into maltene, unconverted and/or remaining asphaltenes has strong tendency to form separated phase from oil, which causes instability of the final product. Such phenomena becomes more obvious when processing "relatively paraffinic residue" where paraffins are present as independent compounds such as wax in addition to side chains of aromatic cores. As used herein "relatively paraffinic residue" is defined as components having the following properties: T5% greater than 340° C.; aromaticity measured by Proton nuclear magnetic resonance (NMR) less than 6%; asphaltene content, measured by $C_7$-insolubles, greater than 3 wt. %. Put simply, streams with high boiling points, but low aromaticity have relatively high paraffinic content. Compositions with relatively paraffinic residue can decrease the stability of the final product. Therefore, according to embodiments disclosed and described herein, the supercritical water reactor effluent 102 is separated into a light 103 stream and a heavy stream 104. The light stream comprising the relatively paraffinic residue. The light stream treated in a reformer 130 to concentrate aromatics and reduce paraffins in the light stream. The reformer effluent, which has a higher concentration of aromatics and a lower concentration of paraffins compared to the light stream 103, is then mixed with the heavy stream to yield a stable final product.

Example

The following example illustrates features of the present disclosure but is not intended to limit the scope of the disclosure.

A simulation was conducted using Aspen HYSYS software build 8.0 for a process according to the embodiment shown in FIG. 3. The petroleum feedstock stream 101a was a heavy vacuum gas oil that had the properties shown in Table 1 below:

TABLE 1

| Property | Unit | Value |
|---|---|---|
| Specific Gravity | API Gravity | 23.0 |
| Total Sulfur | Wt. % Sulfur | 2.2 |
| Distillation (SIMDIST, ASTM 7169) | | |
| 5% | ° C. | 295 |
| 10% | ° C. | 346 |
| 20% | ° C. | 390 |
| 30% | ° C. | 417 |
| 40% | ° C. | 437 |
| 50% | ° C. | 454 |
| 60% | ° C. | 471 |
| 70% | ° C. | 488 |
| 80% | ° C. | 505 |
| 90% | ° C. | 523 |
| 95% | ° C. | 532 |

The water stream 101b is Type I deionized water according to ASTM D1193. The petroleum feedstock stream 101a initially (i.e., before being introduced to pump 310a and pre-heater 320a) had a pressure of 0.1 MPa, a temperature of 15.6° C., and a mass flow rate of 1679.1 tons per day (ton/day). The water stream 101b initially (i.e., before being introduced to pump 310b and pre-heater 320b) had a pressure of 0.0 MPa, a temperature of 25.0° C., and a mass flow rate of 793.3 tons per day (ton/day).

After being introduced to pump 310a, the petroleum feedstock stream 101a had a pressure of 27.0 MPa, a temperature of 19.2° C., and a flow rate of 1679.1 ton/day. After being introduced to the pre-heater 320a, the petroleum feedstock stream 101a had a pressure of 27.0 MPa, a temperature of 150.0° C., and a flow rate of 1679.1 ton/day, which were the conditions of the pressurized, pre-heated petroleum feedstock stream 101a that was introduced to the mixer 330.

After being introduced to pump 310b, the water stream 101b had a pressure of 27.0 MPa, a temperature of 26.7° C., and a flow rate of 793.3 ton/day. After being introduced to the pre-heater 320b, the water stream 101b had a pressure of 27.0 MPa, a temperature of 520.0° C., and a flow rate of 793.3 ton/day, which were the conditions of the pressurized, pre-heated water stream 101b that was introduced to the mixer 330. The distillation profile of the feed stream exiting the mixer is almost same as that of the original feed oil, which indicates that very few or no reactions occur.

At the mixer 330, the pressurized, pre-heated petroleum feed stock stream 101c and the pressurized, heated water stream 101d were mixed to form feed stream 101, which was the stream that exits the mixer 330. Feed stream 101 had a pressure of 27.0 MPa, a temperature of 379.0° C., and a flow rate of 2472.5 ton/day. The feed stream 101 was transferred from the mixer 330 to the supercritical water reactor 110 where the feed stream 101 reacted with the supercritical water in the supercritical water reactor 110. The product of the reactions between the feed stream 101 and the supercritical water in the supercritical water reactor 110 exited the supercritical water reactor 110 as supercritical water effluent 102. Supercritical water effluent 102 had a pressure of 27.0 MPa, a temperature of 425.0° C., and a flow rate of 2472.5 ton/day. Oil fraction in the reactor effluent has the following distillation data shown in Table 2 below.

TABLE 2

| Property | Unit | Value |
|---|---|---|
| Specific Gravity | API Gravity | 27.4 |
| Total Sulfur | Wt. % Sulfur | 2.0 |
| Distillation (SIMDIST, ASTM 7169) | | |
| 5% | ° C. | 169 |
| 10% | ° C. | 225 |
| 20% | ° C. | 295 |
| 30% | ° C. | 365 |
| 40% | ° C. | 395 |
| 50% | ° C. | 420 |
| 60% | ° C. | 448 |
| 70% | ° C. | 468 |
| 80% | ° C. | 493 |
| 90% | ° C. | 521 |
| 95% | ° C. | 525 |

The supercritical water reactor effluent 102 was introduced to a cooler 340 to reduce the temperature of the supercritical water reactor effluent 102. As it exited the cooler 340, the supercritical water reactor effluent 102 had a pressure of 27.0 MPa, a temperature of 365.0° C., and a flow rate of 2472.5 ton/day. The cooled supercritical water reactor effluent 102 was then transferred to a depressurizer 350, where the pressure of the supercritical water reactor effluent 102 was reduced. As it exited the depressurizer 350, the supercritical water reactor effluent 102 had a pressure of 0.3 MPa, a temperature of 241.6° C., and a flow rate of 2472.5 ton/day, which were the conditions of the supercritical water reactor effluent 102 as it entered the separator.

At the separator, the supercritical water reactor effluent 102 was separated into a light (e.g., vapor) stream 103 and a heavy (e.g., liquid) stream 104. The heavy stream 104 that exits the separator 120 had a pressure of 0.3 MPa, a temperature of 241.6° C., and a flow rate of 1370 ton/day. Subsequently, although not shown in FIG. 3, the heavy stream 104 was optionally introduced into a second depressurization unit to depressurize the heavy stream 104. At the exit of the second depressurization unit, the heavy stream 104 had a pressure of 0.2 MPa, a temperature of 241.6° C., and a flow rate of 1370.0 ton/day. This stream has the following distillation data shown in Table 3 below.

TABLE 3

| Distillation (SIMDIST, ASTM 7169) | | |
|---|---|---|
| 5% | ° C. | 309 |
| 10% | ° C. | 345 |
| 20% | ° C. | 376 |
| 30% | ° C. | 406 |
| 40% | ° C. | 424 |
| 50% | ° C. | 441 |
| 60% | ° C. | 455 |
| 70% | ° C. | 470 |
| 80% | ° C. | 496 |
| 90% | ° C. | 523 |
| 95% | ° C. | 525 |

The light stream 103 exiting the separator 120 had a pressure of 0.3 MPa, a temperature of 241.6° C., and a flow rate of 1103.0 ton/day. Although not shown in FIG. 3, the light stream 103 was introduced to a third depressurization unit. At the exit of the third depressurization unit, the light stream 103 had a pressure of 0.2 MPa, a temperature of 241.6° C., and a flow rate of 1141.8 ton/day. Although not shown in FIG. 3, the depressurized light stream 103 was introduced to a second cooler. At the exit of the second cooler, the depressurized, cooled light stream 103 had a pressure of 0.2 MPa, a temperature of 210.0° C., and a flow rate of 1141.8 ton/day. Although not shown in FIG. 3, the depressurized, cooled light stream 103 was introduced to a water-oil separator, where the water in the depressurized, cooled light stream 103 was separated from oil components in the depressurized, cooled light stream 103. At the exit of the water-oil separator, the separated light stream 103 had a pressure of 0.1 MPa, a temperature of 135.0° C., and a flow rate of 310.1 ton/day. The separated light stream 103 is essentially water-free, comprises around 18 wt. % of petroleum feedstock, and includes sulfur, nitrogen, hydrogen sulfide, carbon monoxide, carbon dioxide, and $C_1$ to $C_4$ paraffins. The oil component in the separated light stream 103 has an API gravity of 44 and a T90% of 350° C. This separated light stream 103 is not suitable to be mixed into the final product, because it is likely to make the final product unstable. Therefore, the separated light stream 103 was introduced into a reformer 130.

At the reformer 130 the concentration of aromatic components in the separated light stream is increased. Upon exiting the reformer 130, the reformer effluent 105 had a pressure of 0.7 MPa, a temperature of 485° C., and a flow rate of liquid product of 269.9 ton/day. This stream has the following distillation data shown in Table 4 below.

TABLE 4

Distillation (SIMDIST, ASTM 7169)

| 5% | ° C. | 98 |
| 10% | ° C. | 113 |
| 20% | ° C. | 141 |
| 30% | ° C. | 169 |
| 40% | ° C. | 196 |
| 50% | ° C. | 224 |
| 60% | ° C. | 251 |
| 70% | ° C. | 277 |
| 80% | ° C. | 307 |
| 90% | ° C. | 335 |

The reformer effluent 105 is then mixed with the heavy stream 104 to form a final product stream 106. The final product stream had a pressure of 0.2 MPa, a temperature of 241.3° C., and a flow rate of 1600.5 ton/day. This stream has the following distillation data shown in Table 5 below.

TABLE 5

Distillation (SIMDIST, ASTM 7169)

| 5% | ° C. | 169 |
| 10% | ° C. | 225 |
| 20% | ° C. | 295 |
| 30% | ° C. | 365 |
| 40% | ° C. | 392 |
| 50% | ° C. | 420 |
| 60% | ° C. | 444 |
| 70% | ° C. | 468 |
| 80% | ° C. | 495 |
| 90% | ° C. | 521 |
| 95% | ° C. | 525 |

What is claimed is:

1. A process for forming a petroleum product comprising:
   introducing a feed stream comprising a petroleum feedstock to a supercritical water reactor;
   reacting the feed stream and supercritical water in the supercritical water reactor, thereby forming a supercritical water reactor effluent;
   introducing the supercritical water reactor effluent to a separator to separate the supercritical water reactor effluent into a light stream and a heavy stream;
   introducing at least a portion of the light stream to a reformer to concentrate aromatics in the at least a portion of the light stream, thereby forming a reformer effluent; and
   mixing the reformer effluent and the heavy stream; wherein the reformer effluent does not undergo additional separation steps before mixing with the heavy stream.

2. The process according to claim 1, wherein
   the light stream comprises water and a petroleum phase;
   the process further comprises separating the water and the petroleum phase in the light stream; and
   introducing at least a portion of the light stream to the reformer comprises introducing the petroleum phase to the reformer.

3. The process of claim 1, wherein the process further comprises introducing the light stream to a desulfurization unit to reduce a concentration of sulfur in the light stream before introducing the at least a portion of the light stream to the reformer.

4. The process of claim 1, wherein the feed stream is pressurized before it is introduced to the supercritical water reactor.

5. The process of claim 1, wherein the feed stream is pre-heated before it is introduced to the supercritical water reactor.

6. The process of claim 1, wherein the feed stream comprises a petroleum feedstock stream and a water stream.

7. The process of claim 6, wherein the process further comprises mixing the petroleum feedstock stream and the water stream in a mixer to form the feed stream before the feed stream is introduced into the supercritical water reactor.

8. The process of claim 1, wherein the process further comprises introducing the supercritical water reactor effluent into a cooler to reduce a temperature of the supercritical water reactor effluent before the supercritical water reactor effluent is introduced to the separator.

9. The process of claim 1, wherein the process further comprises introducing the supercritical water reactor effluent into a depressurization unit to reduce a pressure of the supercritical water reactor effluent before the supercritical water reactor effluent is introduced to the separator.

10. The process of claim 1, wherein the at least a portion of the light stream introduced to the reformer has a water content that is less than 10 wt. % ppm.

11. The process of claim 1, wherein the at least a portion of the light stream introduced to the reformer has a sulfur concentration that is less than 0.7 wt. % ppm.

12. The process of claim 1, wherein a temperature in the reformer is greater than 450° C. and less than 550° C.

13. The process of claim 1, wherein a pressure in the reformer is greater than 0.3 MPa and less than 4.0 MPa.

14. The process of claim 1, wherein the feed stream has an atmospheric residue T5% greater than 330° C.

15. The process of claim 1, wherein the feed stream has a vacuum residue with a T5% greater than 550° C.

16. The process of claim 1, wherein the feed stream has a vacuum gas oil (VGO) having a T5% that is greater than 330° C.

17. The process of claim 1, wherein the feed stream has a VGO having a T95% that is less than 595° C.

18. The process of claim 1, wherein the feed stream has an asphaltene content of greater than 2 wt. %.

19. The process of claim 1, wherein a pressure of the feed stream that is introduced to the supercritical water reactor is greater than 20 MPa.

20. The process of claim 19, wherein a temperature within the supercritical water reactor is greater than 350° C. and less than 600° C.

* * * * *